(12) United States Patent
Kim et al.

(10) Patent No.: US 9,313,735 B2
(45) Date of Patent: Apr. 12, 2016

(54) METHOD AND APPARATUS FOR EFFICIENTLY CONTROLLING UPLINK CONTROL SIGNAL OF USER EQUIPMENT IN WIRELESS COMMUNICATION SYSTEM

(71) Applicant: Samsung Electronics Co., Ltd., Gyeonggi-do (KR)

(72) Inventors: Sang Bum Kim, Gyeonggi-do (KR); Soeng Hun Kim, Gyeonggi-do (KR); Kyeong In Jeong, Gyeonggi-do (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/385,489

(22) PCT Filed: Mar. 14, 2013

(86) PCT No.: PCT/KR2013/002047
§ 371 (c)(1),
(2) Date: Sep. 15, 2014

(87) PCT Pub. No.: WO2013/137656
PCT Pub. Date: Sep. 19, 2013

(65) Prior Publication Data
US 2015/0072720 A1    Mar. 12, 2015

(30) Foreign Application Priority Data
Mar. 14, 2012   (KR) ........................ 10-2012-0026113

(51) Int. Cl.
*H04W 52/14*   (2009.01)
*H04B 10/293*   (2013.01)
*H04W 52/02*   (2009.01)
*H04W 52/40*   (2009.01)
(Continued)

(52) U.S. Cl.
CPC ........ *H04W 52/0212* (2013.01); *H04W 52/146* (2013.01); *H04W 52/40* (2013.01);
(Continued)

(58) Field of Classification Search
CPC .......... H04W 52/0212; H04W 52/146; H04W 52/46; H04W 52/241; H04W 52/247; H04W 52/362; H04B 10/293; H04B 17/40
See application file for complete search history.

(56) References Cited

U.S. PATENT DOCUMENTS

2006/0072485 A1* 4/2006 Cairns ............... H04L 25/03006
370/290
2006/0221750 A1* 10/2006 Kuo .................... H04W 52/146
365/226

(Continued)

FOREIGN PATENT DOCUMENTS

| KR | 10-2009-0102594 | 9/2009 |
| KR | 10-2010-0121445 | 11/2010 |
| KR | 10-2011-0108231 | 10/2011 |

OTHER PUBLICATIONS

International Search Report dated Jun. 27, 2013 in connection with International Patent Application No. PCT/KR2013/002047, 5 pages.

(Continued)

*Primary Examiner* — Andrew Wendell (57) ABSTRACT

The present invention relates to a method and an apparatus for efficiently controlling an uplink control signal of user equipment in an environment where a macro cell and a repeater exist together, and the method for controlling uplink transmission power of the user equipment in the wireless communication system, according to the present invention, comprises: an obtaining step for receiving a reference signal from a base station and obtaining a channel state information value; a determining step for determining whether a scaling condition is satisfied by using the channel state information value that is obtained; a calculating step for calculating a transmission power on the basis of scheduling information when the scaling condition is satisfied; and a transmitting step for transmitting data by using the transmission power that is calculated.

14 Claims, 10 Drawing Sheets

(51) Int. Cl.
*H04W 52/46* (2009.01)
*H04W 52/24* (2009.01)
*H04W 52/36* (2009.01)
*H04W 88/02* (2009.01)

(52) U.S. Cl.
CPC ........... *H04W 52/46* (2013.01); *H04W 52/241* (2013.01); *H04W 52/247* (2013.01); *H04W 52/362* (2013.01); *H04W 88/02* (2013.01); *Y02B 60/50* (2013.01)

(56) References Cited

U.S. PATENT DOCUMENTS

| | | | |
|---|---|---|---|
| 2009/0005028 A1* | 1/2009 | Haimovich et al. | 455/423 |
| 2009/0154403 A1* | 6/2009 | Niwano | H04W 52/282 370/329 |
| 2010/0087202 A1* | 4/2010 | Ventola | H04W 52/146 455/452.1 |
| 2011/0002410 A1* | 1/2011 | Forenza et al. | 375/267 |
| 2013/0053050 A1* | 2/2013 | Kang et al. | 455/452.1 |
| 2014/0029522 A1* | 1/2014 | Farmanbar | H04L 5/0035 370/329 |

OTHER PUBLICATIONS

Written Opinion of International Searching Authority dated Jun. 27, 2013 in connection with International Patent Application No. PCT/KR2013/002047, 4 pages.

\* cited by examiner

METHOD AND APPARATUS FOR EFFICIENTLY CONTROLLING UPLINK CONTROL SIGNAL OF USER EQUIPMENT IN WIRELESS COMMUNICATION SYSTEM

CROSS-REFERENCE TO RELATED APPLICATION(S)

The present application claims priority under 35 U.S.C. §365 to International Patent Application No. PCT/KR2013/002047 filed Mar. 14, 2013, entitled "METHOD AND APPARATUS FOR EFFICIENTLY CONTROLLING UPLINK CONTROL SIGNAL OF USER EQUIPMENT IN WIRELESS COMMUNICATION SYSTEM". International Patent Application No. PCT/KR2013/002047 claims priority under 35 U.S.C. §365 and/or 35 U.S.C. §119(a) to Korean Patent Application No. 10-2012-0026113 filed Mar. 14, 2012 and which are incorporated herein by reference into the present disclosure as if fully set forth herein.

TECHNICAL FIELD

The present invention relates to a power control method for use in a wireless communication system and, in particular, to a method and apparatus for controlling uplink transmission power of a User Equipment (UE) efficiently in an environment where a macro cell and repeaters coexist.

BACKGROUND ART

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution (LTE) system, as one of the next-generation mobile communication systems, is underway in the $3^{rd}$ Generation Partnership Project (3GPP). LTE is a technology designed to provide high speed packet-based communication of up to 100 Mbps and aims at commercial deployment around 2010 timeframe. In order to accomplish the aim, a discussion is being held on several schemes: one scheme for reducing the number of nodes located in a communication path by simplifying a configuration of the network, and another scheme for maximally approximating wireless protocols to wireless channels.

Meanwhile, unlike voice service, the data service is provided on the resource determined according to the data amount to be transmitted and channel condition. Accordingly, the wireless communication system, especially cellular communication, is provided with a scheduler manages transmission resource allocation in consideration of the required resource amount, channel condition, data amount, etc. This is the fact in the LTE system as the next generation mobile communication system, and the scheduler located at an evolved Node B (eNB) manages the transmission resource allocation.

Recent studies are focused on the LTE-Advanced (LTE-A) for improving data rate with the adoption of various new technologies to the LTE communication system. Among them, some technologies are taken into consideration for Heterogeneous Network (HetNet) environment and Distributed Antenna System (DAS). The HetNet denotes a wireless network made up of a plurality of cells having various sizes and capabilities such as macro cells, pico cells, and femto cells. In such a way of distributing small cell eNBs different in size from the macro eNB or transmit/receive antenna within the macro cell area, it is possible to provide the UE with the best service. Particularly from the view point of UE power consumption, the power consumption of the UE can be improved by receiving signals from a plurality of eNBs or using a plurality of reception antennas.

DISCLOSURE OF INVENTION

Technical Problem

The present invention aims to provide a method and apparatus for controlling uplink transmission power of a UE efficiently in an environment where a macro cell and repeaters coexist.

Solution to Problem

In accordance with an aspect of the present invention, a uplink transmit power control method of a terminal in a wireless communication system includes acquiring a channel status information value from a reference signal transmitted by a base station, determining whether a scaling condition is fulfilled based on the channel status information value, calculating, when the scaling condition is fulfilled, transmit power, and transmitting data at the calculated transmit power.

In accordance with another aspect of the present invention, a terminal for controlling uplink transmit power in a wireless communication system includes a transceiver which transmit and receive signals to and from a base station and a controller which controls acquiring a channel status information value from a reference signal transmitted by a base station, determining whether a scaling condition is fulfilled based on the channel status information value, calculating, when the scaling condition is fulfilled, transmit power, and transmitting data at the calculated transmit power.

Advantageous Effects of Invention

The uplink transmission power control method of the present invention is advantageous in terms of controlling uplink transmission power of a UE efficiently in adaptation to the change of transmit power amount even when the UE is required to perform rapid power control in an environment where a macro cell and repeaters coexist.

MODE FOR THE INVENTION

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

The present invention relates to a method and apparatus for controlling uplink transmission power of a UE efficiently in an environment where a macro cell and repeaters coexist.

In the environment where the macro cell and repeaters coexist, the plural repeaters are distributed within a macro cell area so as to reduce the transmit power of the UE considerably. In the case that the UE moves to approach a repeater quickly, however, the required transmit power level of the UE changes abruptly. In order to achieve improvement in view of power consumption of the UE, the UE has to have the power control capability capable of coping with abrupt change of the transmit power amount.

Figure 1:
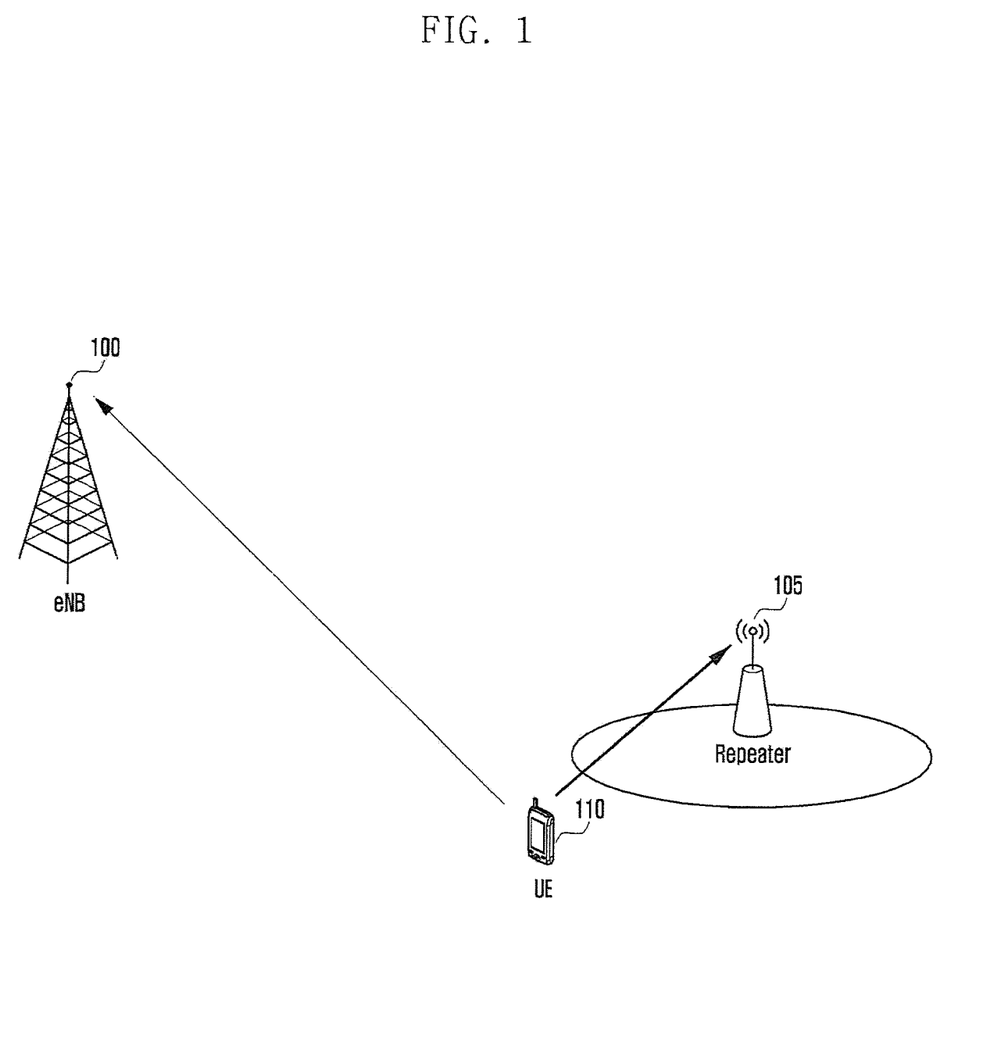
FIG. 1 is a diagram illustrating signal influence between a macro cell and a repeater conceptually in an environment where the macro cell and a repeater cell coexist.

FIG. 1 is a diagram illustrating signal influence between a macro cell and a repeater conceptually in an environment where the macro cell and a repeater cell coexist.

The macro cell eNB 100 has a large service area of about 1 km. Meanwhile, the repeater 105 affects the UE located within an area equal to or less than 500 m.

If the UE 110 which is far the macro cell eNB but near the repeater connects to the macro cell eNB for communication, it may attempt the communication at a relatively high transmit power level to satisfy the minimum power requirements received from the macro cell. If the repeater receives the signal transmitted by the UE and forwards the signal to the macro eNB, such high transmit power is not required. Accordingly, the macro cell eNB and the repeater interoperate to improve the communication quality and suppress interference signals. However, when it moves around or detached from the repeater, the UE has to adjust the transmit power quickly to keep up with the abrupt change of the channel state.

In the conventional LTE system, the uplink transit power level is calculated by equation (1).

$$P_{PUSCH,c}(i) = \min\left\{\begin{array}{c}P_{CMAX,c}(i),\\ 10\log_{10}(M_{PUSCH,c}(i)) + P_{O\_PUSCH,c}(j) +\\ \alpha_c(j) \cdot PL_c + \Delta_{TF,c}(i) + f_c(i)\end{array}\right\} \quad (10)$$

The transmit power ($P_{PUSCH,c}(i)$) of the $i^{th}$ Physical Uplink Shared Channel (PUSCH) subframe of the serving cell c is calculated with a number of resource blocks ($M_{PUSCH,c}(i)$), power offset ($\Delta_{TF,c}$) derived from Modulation and Coding Scheme (MCS), path loss ($PL_c$), and Transmit Power Control (TPC) command ($f_c(i)$) $P_{PUSCH,c}(i)$ cannot be greater than maximum uplink transmit power ($P_{CMAX,c}(i)$). In equation (1), $f_c(i)$ denotes an accumulated value of TPC of the serving cell c. $P_{O\_PUSCH,C}$ denotes a higher layer parameter as a sum of a cell-specific value and a UE-specific value. Typically, $P_{O\_PUSCH,C}$ may be a value determined differently depending on the transmission type of Physical Uplink Shared Channel (PUSCH) such as semi-persistent scheduling, dynamic scheduling, and random access response. $\alpha_c$ denotes a 3-bit cell-specific value provided by the higher layer as a weight value applied to the uplink transmit power calculation for pass loss (the larger this value is, the more the pass loss influences to the uplink transmission power) and restricted in depending on the transmission type of PUSCH. j is used to indicate the type of PUSCH. J=0 indicates semi-persistent scheduling, J=1 indicates dynamic scheduling, and J=2 denotes random access response. In the above equation, $PL_c$ denotes path loss in the cell, and the uplink transmit power is determined based on the path loss of the downlink channel of the corresponding cell. The more the number of blocks is and the higher the MCS level to be applied is, the greater the transmit power is required, and this is reflected with $10\log_{10}M_{PUSCH,c}(i)$ and $\Delta_{TF,c}$.

$f_c(i)$ is used to change the transmit power dynamically according to the channel state and can be transmitted in two modes: accumulative TPC command and absolute TPC command. The accumulative TPC command is defined as $f_c(i)=f_c(i-1)+\delta_{PUSCH,c}(i-K_{PUSCH})$ That is, $f_c(i)$ is determined by accumulating a predetermined power step value onto the previous value $f_c(i-1)$. $\delta_{PUSCH,c}$ denotes the power step value. $K_{PUSCH}$ is used to indicate the subframe carrying the power step value. This value is determined differently for TDD and FDD. For example, if $K_{PUSCH}=4$, the power step value carried four subframes before is used to derive the current transmit power. In contrast, the absolute TPC command indicates $P_{O\_PUSCH,C}$, $\alpha_c PL_c$, and power step value independently of the previous TPC command value. The accumulative TPC command is the default mode which is applied to both the PUSCH and PUCCH. The absolute TPC command is applied exclusive to the PUSCH typically when uplink scheduling does not occur frequently. Switching between these two modes occurs through RRC signaling. In the 3GPP TS36.213 specifies the power step values of the two modes for use in determining PUSCH transmit power. Particularly, the accumulative TPC command is made up of 2 bits indicating one of −1, 0, 1, and 3 dB. Accordingly, the UE may increase the transmit power up to 3 dB or decrease the transmit power up to −0.1 dB by subframe. This may not be enough to reflect the abruptly change of channel state.

The TPC command is sent to the UE as a part of Downlink Control Information (DCI). In order to provide the UE with various control informations, the eNB transmitted PDCCH including DCI message. However, the carried information may differ depending on the UE. For example, the UE's transmission mode has nothing to do with MIMO, MIMO-related information is not necessary. In order to reduce signaling overhead, several DCI formats are defined for respective purposes. Also, the number of formats is restricted to reduce complexity.

The DCI formats include: formats 0, 1, 1A, 1B, 1C, 1D, 2, 2A, 2B, 2C, 3, 3A, and 4. Here, the DCI formats 0, 3, 3A, and 4 contain the TPC command for PUSCH; and the DCI formats 1, 1A, 1B, 1C, 1D, 2, 2A, 2B, 2C, 3, and 3A contain the TPC command for PUCCH. Particularly, DCI formats 3 and 3A are used only for power control of PUSCH and PUCCH. These two formats have the power control adjustment bits of 2 and 1 respectively.

The present invention proposes a method for adapting the transmit power more quickly to the channel state changing abruptly as compared to the conventional technologies.

Embodiment 1

In LTE, various types of reference signals (RSs) are transmitted in downlink. The RSs include Cell-specific RS, MBMS RS, UE-specific RS, positioning RS, and Channel Status Information RS (CSI-RS).

Among them, the CSI-RS is used to derive Channel Status Information (CSI) transmitted in uplink. The CSI includes Channel Quality Indicator (CQI), Precoding Matrix Indicator (PMI), and Rank Indicator (RI). The CQI is a channel state indicator for use in MCS determination of the eNB. The PMI and RI are used to support MIMO operation.

For this reason, the CSI-RS informs well of the channel condition. Although the CSI-RS is transmitted for use in determining the downlink channel state, it can be used for estimation uplink channel condition. For example, if a UE moves to approach a repeater receiver, both the uplink and downlink channels statuses are improved abruptly. Of course, the CSI-RS reflects this. Accordingly, the CSI-RS can be used to determine the transmit power of the UE. In this respect, the present invention proposes a method of scaling the power control value automatically when the CSI-RS reporting value becomes equal to or greater/less than a predetermined threshold. This makes it possible, when the channel condition changes abruptly due to the approach or going far away from the repeater receiver, to increases the power step value automatically, thereby reflecting the abrupt change of the channel condition to the transmit power determination immediately.

Figure 2:
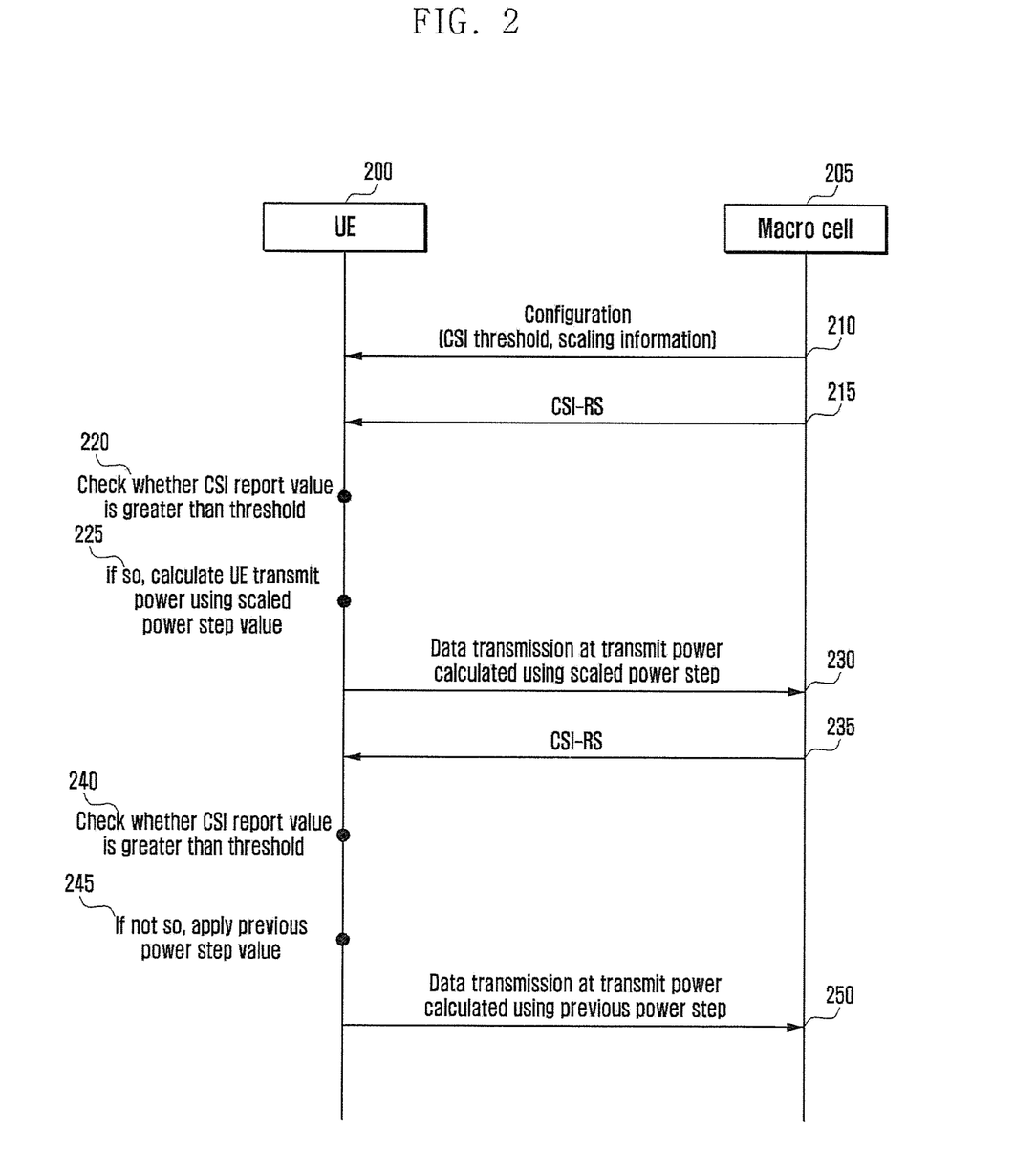
FIG. 2 is a signal flow diagram illustrating signal flows in embodiment 1.

FIG. 2 is a signal flow diagram illustrating signal flows in embodiment 1.

First, the UE 200 receives a CSI threshold value and scheduling information from the eNB 205 at step 210. The CSI threshold value is used for determining the time point for scaling the power step value. There may be one or more CSI threshold values. If two threshold values are configured, the power step value is scaled when the CSI-RS report value is greater than the first threshold value. The power step value is scaled when the CSI-RS report value is less than the second threshold value.

The scaling information indicates the level of scaling the power step. For example, if it is set to 3 dB, the power step increases by 3 db in scaling. Although these two values may be informed to the UE through RRC signaling, it may be possible to use predefined values to reduce signaling overhead. Next, the UE receives CSI-RS at step 215. The UE determines the CSI-RS value based on this signal and compares the CSI value with the threshold value at step 220.

If a scaling trigger condition is fulfilled, the UE calculates the transmit power with the scaled power step value at step 225. The UE transmits data at transmit power calculated based on the scaled power step at step 230. The UE receives the CSI-RS again at step 235. If the scaling trigger condition is not fulfilled at step 240, the UE applies the previous power step value at step 245. The UE transmits the data at the transmit power calculated based on the previous power step value at step 250.

Figure 3:
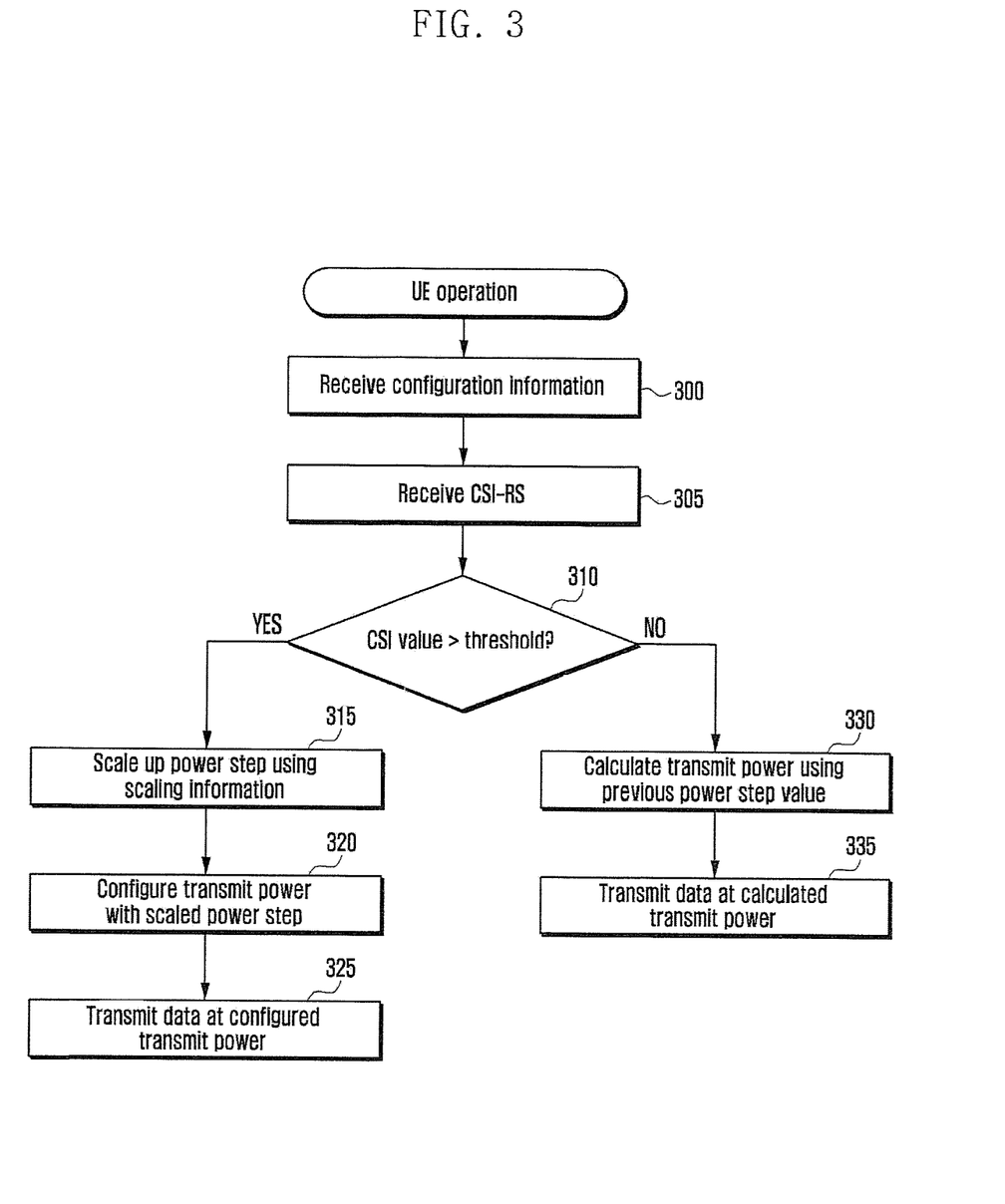
FIG. 3 is a flowchart illustrating the operation procedure of the UE according to embodiment 1.

FIG. 3 is a flowchart illustrating the operation procedure of the UE according to embodiment 1.

First, the UE receives a dedicated RRC message from the eNB at step 300. This message includes a CSI threshold value and scheduling information. The UE receives CSI-RS from the eNB at step 305. The UE may derive the CSI information to be reported to the eNB using the CSI-RS. The UE compares the derived CSI information value with the threshold value to determine whether a scheduling condition is fulfilled at step 310. If the scaling condition is fulfilled, the UE applies the scaled power step at step 315. The UE calculates the transmit power using the scaled power step value at step 320. The UE transmits the data at the calculated transmit power level at step 325. If the scaling condition is not fulfilled, the UE calculates the transmit power in the previous power step value range at step 330. The UE transmits the data at the calculated transmit power level at step 335.

Embodiment 2

Another embodiment of the present invention proposes a method for adapting the transmit power more quickly to the channel status changing abruptly in such a way of defining new power control DCI in the stead of DCI format 3/3A. The new DCI format has power control adjustment bits more than those of the legacy DCI formats 3 and 3A. That is, the power control adjustment bit length is equal to or greater than 3 so as to have wider power step.

For example, the 3-bit power control information may have a set of power step values {−12, −9, −6, −3, 3, +6, +9, +12} as compared to the conventional sets of power step values {−1, 0, +1, +3} and {−1, +1}. Of course, the set may be made up of other values than those proposed in the present invention.

Figure 4:
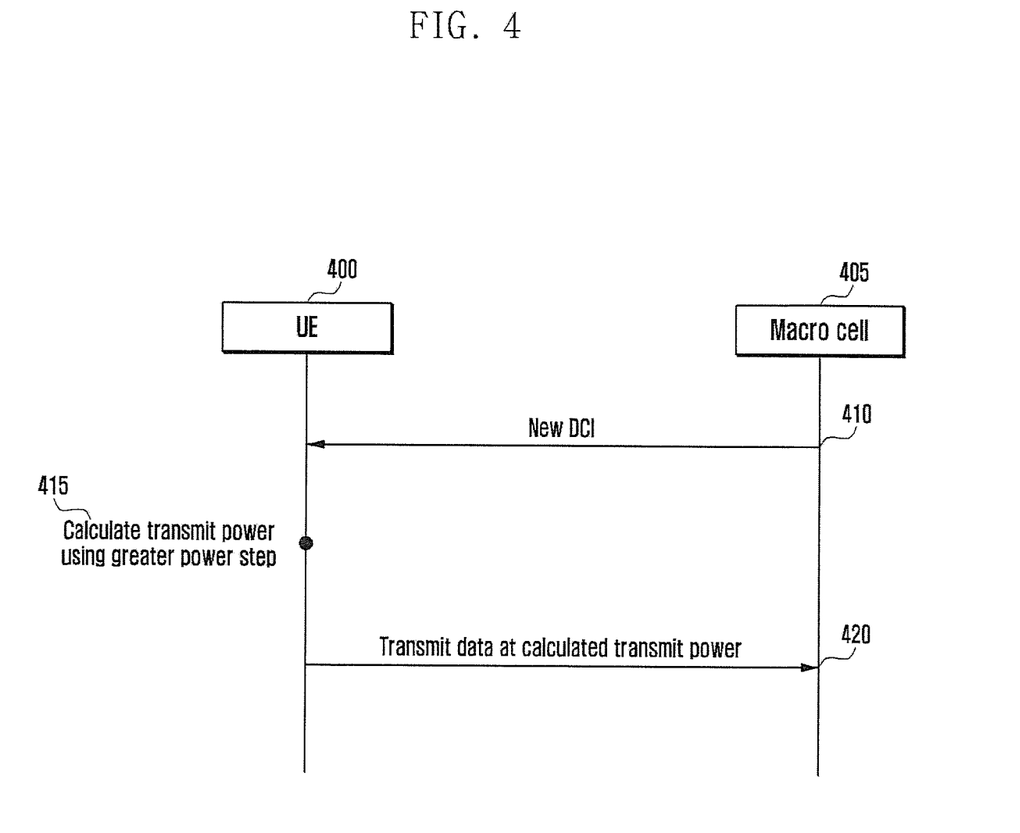
FIG. 4 is a signal flow diagram illustrating signal flows in embodiment 2.

FIG. 4 is a signal flow diagram illustrating signal flows in embodiment 2.

First, the UE 400 receives a new DCI format from the eNB 405 at step 410. The DCI formation includes the info nation having the power step value wide in range. The UE calculates the transmit power by applying the corresponding power step value at step 415. The UE transmits data at the calculated transmission power level at step 420.

Figure 5:
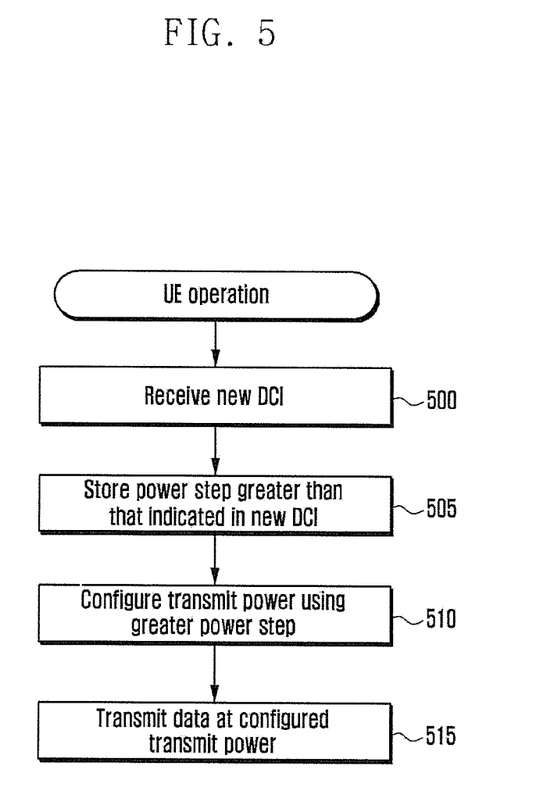
FIG. 5 is a flowchart illustrating the operation procedure of the UE according to embodiment 2.

FIG. 5 is a flowchart illustrating the operation procedure of the UE according to embodiment 2.

The UE receives a new DCI at step 500. The UE stores the power step value carried in the DCI at step 505. The UE calculates the transmit power using the corresponding power step value at step 510. The UE transmits data at the calculated transmit power level at step 515.

Embodiment 3

According to another embodiment of the present invention, it is possible to adapt the transmit power more quickly to the channel state changing abruptly by increasing the bit length of the TCP command included in the legacy DCI format.

In the legacy DCI format, the TPC command is 2 bits. It is possible to increase the bit length to 3 or more so as to indicate a greater power step value. This increases the size of the legacy DCI format too and may cause compatibility problem. However, by restricting the number of DCI formats, it is possible to avoid the complexity problem which may be caused by the increase of the number of DCI formats.

Figure 6:
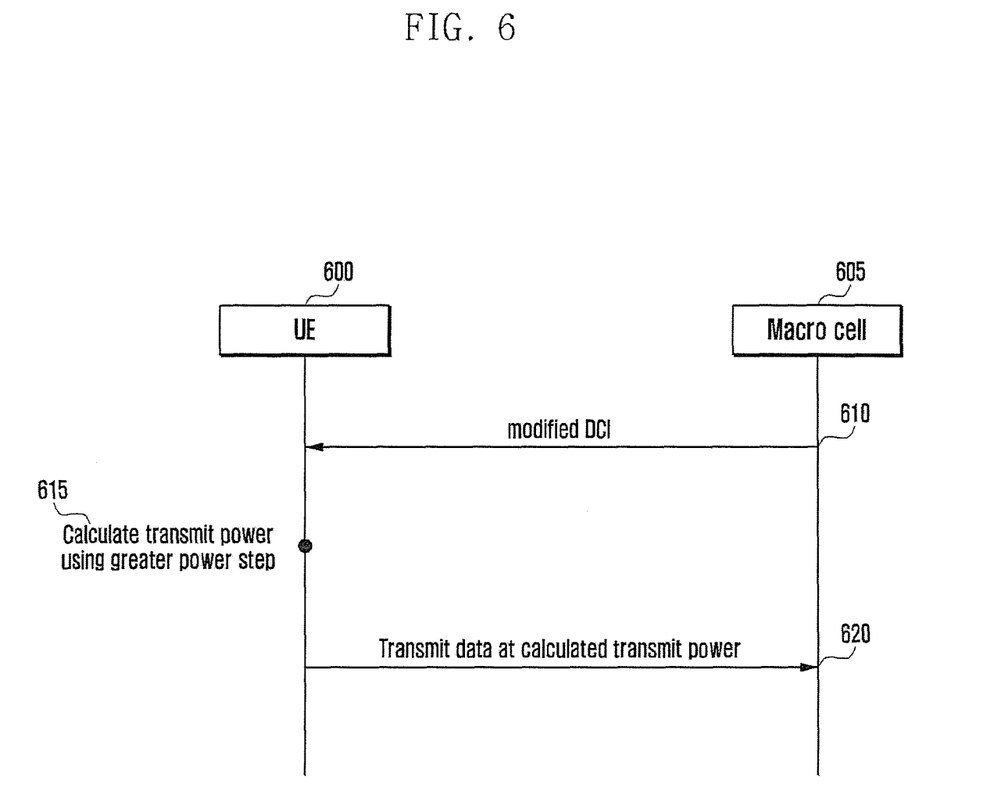
FIG. 6 is a signal flow diagram illustrating signal flows according to embodiment 3.

FIG. 6 is a signal flow diagram illustrating signal flows according to embodiment 3.

First, the UE 600 receives an extended DCI format from the eNB 650 at step 610. The corresponding DCI format is made up of power control bits equal in number to or greater than 3 bits. The UE calculates the transmit power by applying the corresponding power step value at step 615. The UE transmits data at the calculated transmit power level at step 620.

Figure 7:
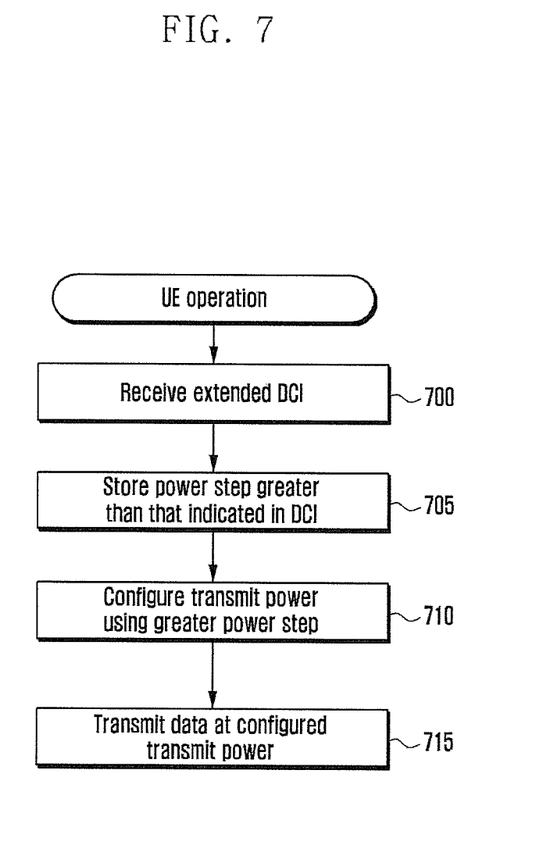
FIG. 7 is a flowchart illustrating the operation procedure of the UE according to embodiment 3.

FIG. 7 is a flowchart illustrating the operation procedure of the UE according to embodiment 3.

The UE receives an extended DCI at step 700. The UE stores the power step value extracted from the DCI at step 705. The UE calculates the transmit power using the corresponding power step value at step 710. The UE transmits data at the calculated transmit power level at step 715.

Embodiment 4

Since LTE Rel-10, the data rate can be increases by aggregating a plurality of carriers. This technique is referred to as Carrier Aggregation (CA).

The TPC command for power control of PUCCH is carried in the DCI format 1A/1B/1D/1/2A/2/2B/2C. If the UE uses a SCell in addition to a PCell and of the SCell has a UL carrier, there is no need of performing PUCCH power control in the SCell. Accordingly, no PUCCH power control bit is used in the DCI for SCell. If this bit is used form PUSCH power control in another SCell or PUCCH power control in the PCell, it is possible to adapt the transmit power of the terminal to the channel state changing abruptly. At this time, it is necessary whether to apply the bit value to the PCell or another SCell. In CA, it is possible to use the same time and wireless path loss reference values for the neighboring carriers in view of frequency, and a set of these carriers is referred to as Time Alignment (TA) group. The unused PUCCH power control bit of a certain SCell can be used for PUSCH power control in the PCell or another SCell within the same TA group or PUCCH power control in the PCell. Through RRC signaling, it is possible to indicate the target, i.e. PCell or another SCell.

Figure 8:
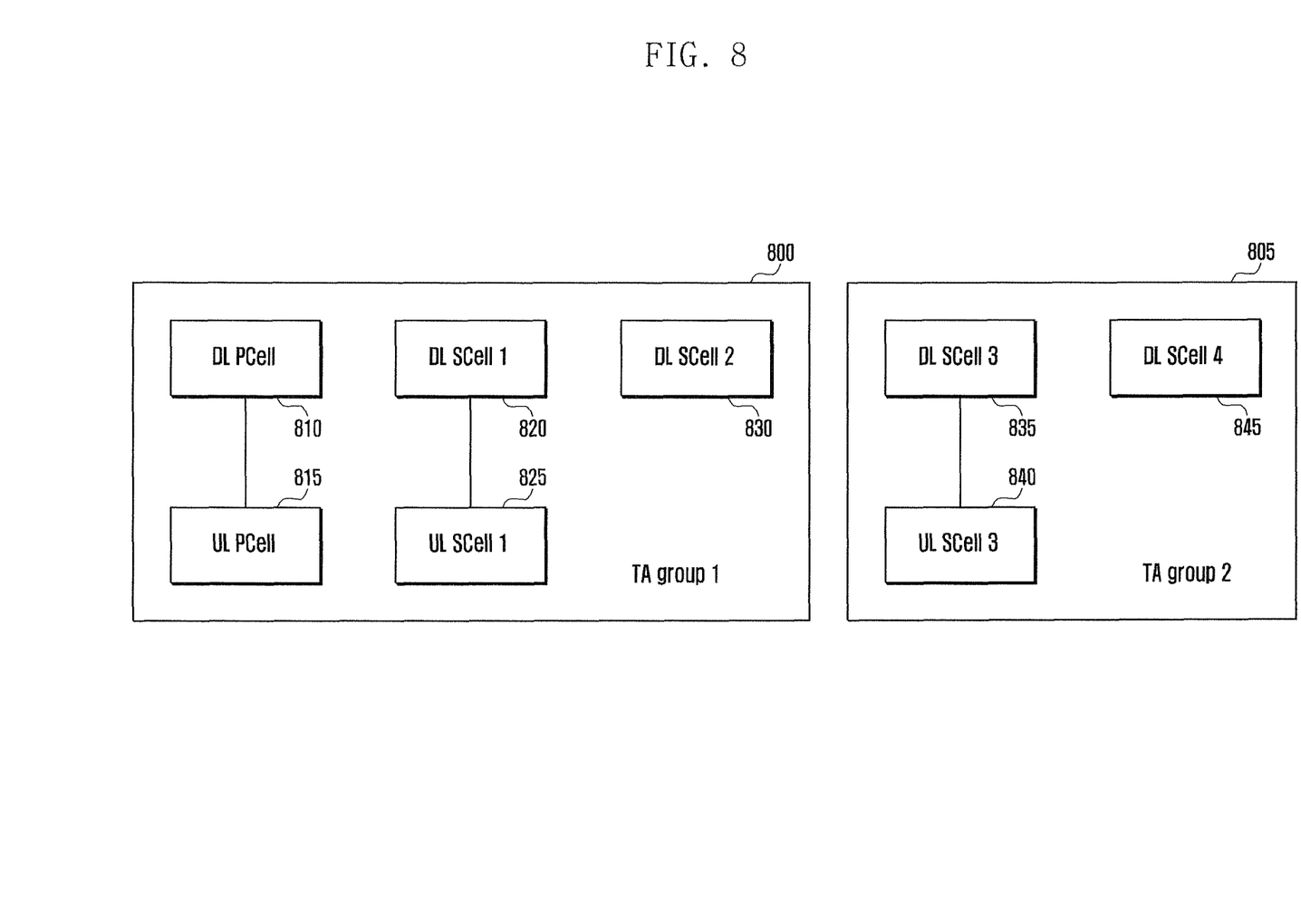
FIG. 8 is a diagram illustrating CA configurations of two TA groups.

FIG. 8 is a diagram illustrating CA configurations of two TA groups.

For example, there are two TA groups 800 and 805 of plural carriers each. The first TA group 800 includes DL/UL PCell, DL/UL SCell 1, and DL/UL SCell 2. The PCell and SCell 1 have a UL linked to the DL carrier each, but the SCell 2 has only a DL carrier. In CA, it is not mandatory to have a linked UL carrier. The carriers have the same time and wireless pass loss reference values for use in timing synchronization and transmit power and power headroom calculations. The second TA group 805 has DL/UL SCell 3 and DL SCell 4. It is not mandatory for the TA group to have the PCell. If the PDSCH assignments of the SCell 2 and SCell 4 are carried in the DCI format 1A/1B/1D/1/2A/2/2B/2C, the corresponding DCI format has the PUCCH power control bit. However, the PUCCH power control bit is not used actually in accordance with the conventional technology. Accordingly, the PUCCH power control bit included in the DCI of the SCell 2 is used for UE transmit power calculation in the UL PCell and UL SCell 1, and the PUCCH power control bit including in the DCI of the SCell 4 is used in the UL SCell 3. It may also be considered to notify of cell, i.e. PCell or another SCell, to which the saved bit is applied through RRC signaling. If the corresponding bit is received, the UE increases the power step as much as indicated by the bit. This gives the same effect as applying the scaled power step.

Figure 9:
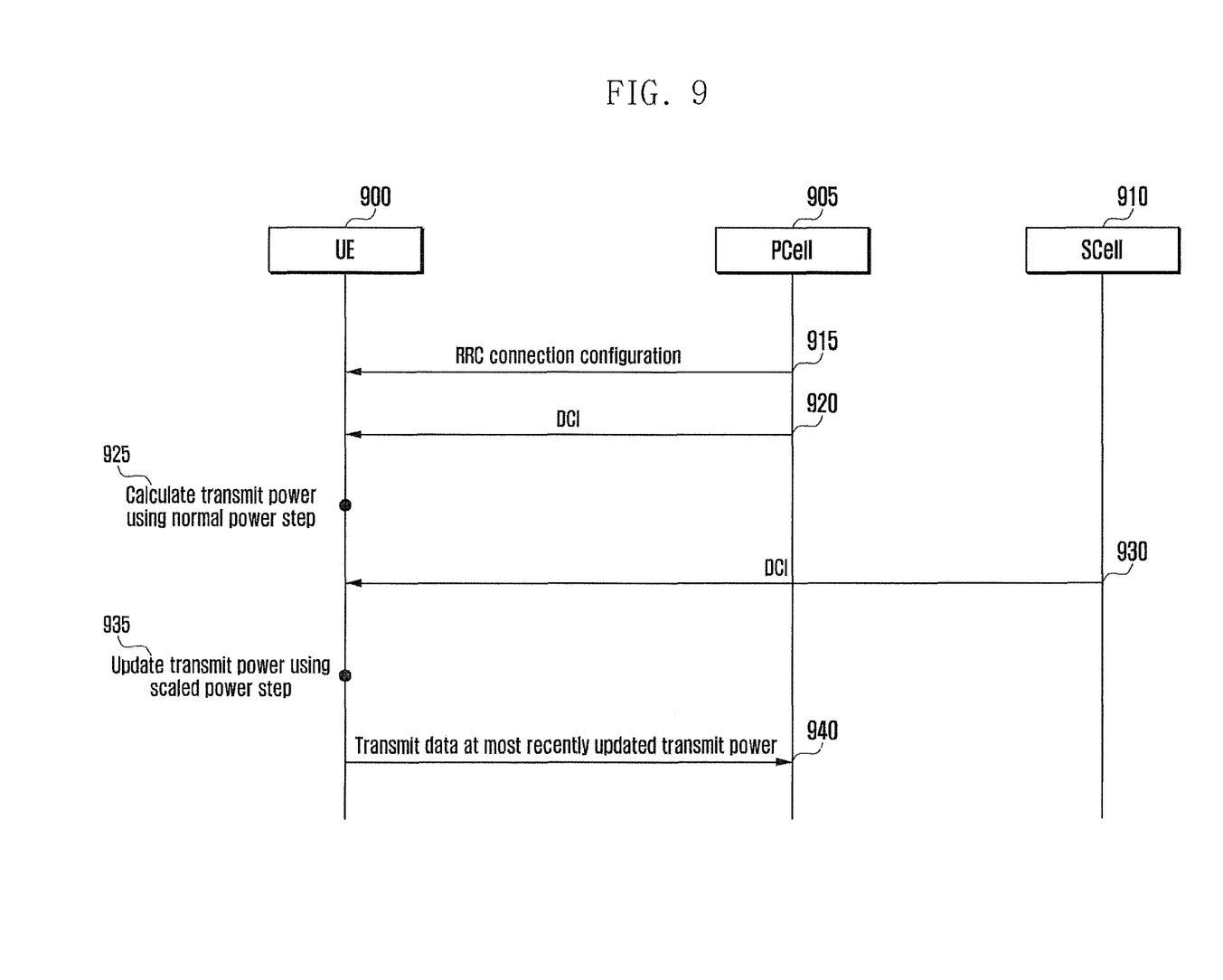
FIG. 9 is a signal flow diagram illustrating signal flows according to embodiment 4.

FIG. 9 is a signal flow diagram illustrating signal flows according to embodiment 4.

The UE is served through the PCell 905 and the SCell 910 belonging to the same TA group. The SCell has not UL carrier. The PCell notifies the UE of a target cell for using the PUCCH power control bit of the DCI of the SCell therein at step 915. In this embodiment, the PCell is notified as the target cell. The eNB sends the UE the uplink resource allocation information (PUSCH grant) through the DCI format 0 at step 920. The corresponding DCI includes the PUSCH power control bit. The UE calculates the transmit power using this bit value at step 925. The SCell sends the UE a DCI formation for PDSCH assignment at step 930. This format includes the PUCCH power control bit. Since the SCell has not UL carrier, the corresponding bit is used for calculating PUSCH transmit power of the PCell. The UE increases the power step value as much as indicated by the corresponding bit at step 935. The additionally increased power step value gives the scaling effect. Alternatively, it is also possible to apply the SCell PUCCH power control bit to the PUCCH of the PCell. For this purpose, the information indicating PUCCH or PUCCH to which the SCell PUCCH power control bit is applied is sent additionally through RRC signaling.

Figure 10:
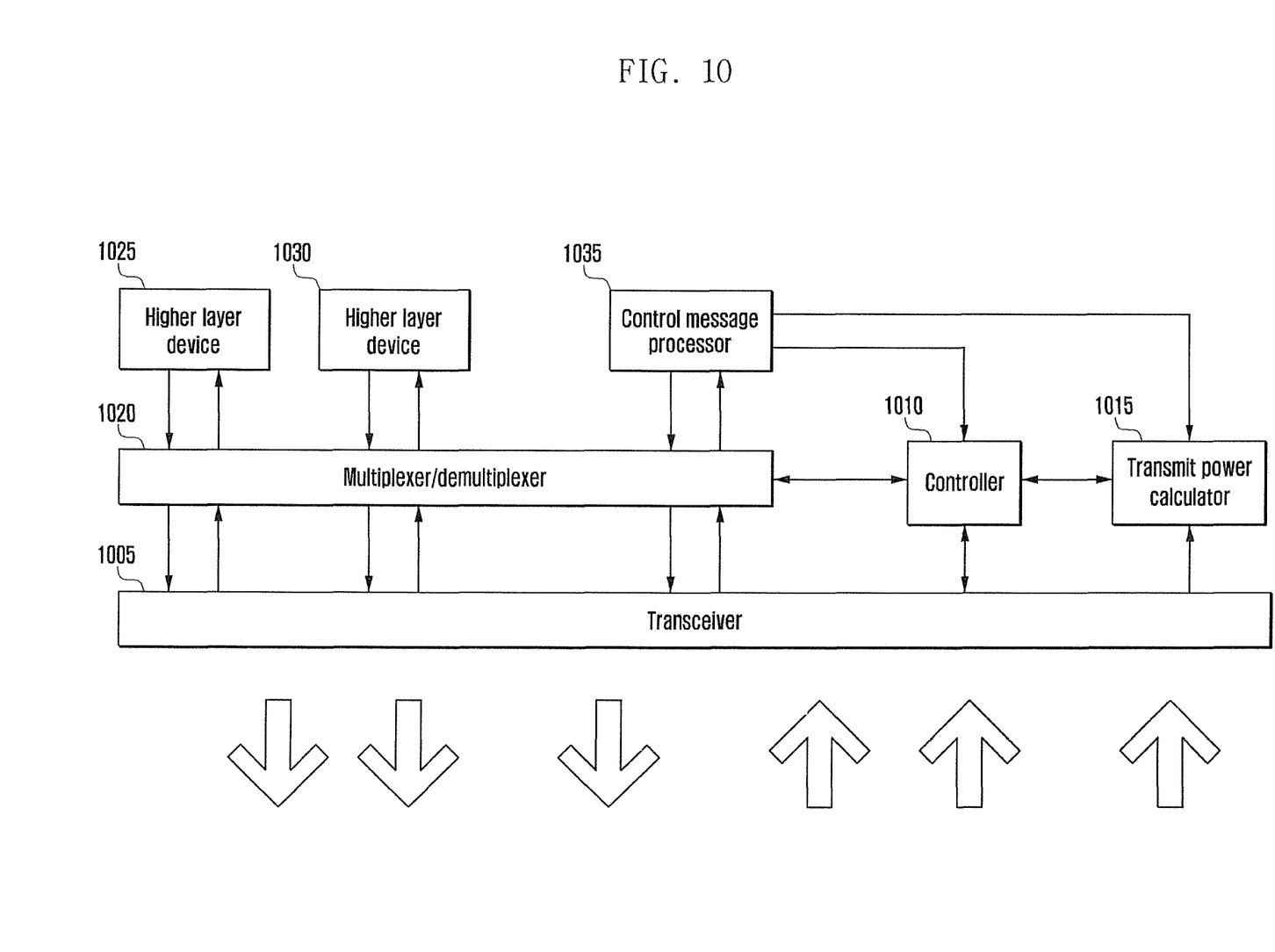
FIG. 10 is a block diagram illustrating a configuration of the UE according to an embodiment of the present invention.

FIG. 10 is a block diagram illustrating a configuration of the UE according to an embodiment of the present invention. As shown in FIG. 10, the UE of the present invention includes a transceiver 1005, a PH calculator 1015, a controller 1010, a multiplexer/demultiplexer 1020, a control message processor 1035, and higher layer devices 1025 and 1030.

The transceiver 1005 receives data and predetermined control signals on the downlink carrier and transmits data and predetermined control signals on the uplink carrier.

The controller 1010 instructs the multiplexer/demultiplexer to generate MAC PDU according to the scheduling information, e.g. uplink grant, received by the transceiver. If there is any instruction for applying the extended power step, the controller 1010 controls the UE to calculate the transmit power by applying the power step. Where there is such instruction is determined based on the eNB identifier provided by the control message processor 1035. The transmit power calculator 1015 calculates the transmit power of the UE and sends the transmit power value to the controller under the control of the controller.

The multiplexer/demultiplexer 1020 is responsible for multiplexing data generated by the higher layer device 1025 and the control message processor 1035 or demultiplexes the data received by the transceiver and delivers the demultiplexed data to the corresponding higher layer device 1025 or the control message processor 1035.

The control message processor 1035 processes the control message transmitted by the network and takes an appropriate action. For example, the control message processor transfers the measurement configuration information extracted from the control message to the controller or sends the measurement information to the transceiver 1005 to configure the carriers. The higher layer device 1025 may be configured per service and processes data generated by the user service such as FTP and VoIP and transfers the processed data to the multiplexer/demultiplexer or processes the data from the multiplexer/demultiplexer and delivers the processed data to the service applications of the higher layer.

Although the description is directed to the case where the UE is made up of a plurality of blocks responsible for different functions, the present invention is not limited thereto. For example, the function of the transmit power calculator 1015 may be performed by the controller 1010 itself.

In this case, the transceiver 1005 may receive the scaling condition and scaling information from the eNB.

The controller 1010 calculates the channel status information value based on the reference signal transmitted by the eNB, determines whether the scaling condition is fulfilled based on the channel status information value, calculates, if the scaling condition is fulfilled, the transmit power based on the scaling information, and controls the UE to transmit data at the calculated transmit power level. If the scaling condition is not fulfilled, the controller 1010 may control the UE to transmit data at the previous transmit power level.

In this case, if the channel status information value is greater than a predetermined threshold value, the control unit 1010 may determine that the scaling condition is fulfilled.

According to another embodiment of the present invention, the transceiver 1005 may receive the downlink control information including the power control adjustment information of at least 3 bits and, in this case, the controller 1010 may calculate the transmit power using the received downlink control information.

According to another embodiment of the present invention, the transceiver 1005 may receive the downlink control information including the transmit power control command information of at least 3 bits and, in this case, the controller 1010 may calculate the transmit power using the received downlink control information.

According to another embodiment of the present invention, the control unit 1010 receives the downlink control information indicating a certain cell different from the cell having no uplink carrier of which uplink power control bit is to be used therein and calculates the transmit power using the received downlink control information.

According to various embodiments of the present invention, it is possible to control the uplink transmission power of the UE efficiently in quick adaptation to abrupt change of transmit power in an environment where a macro cell and repeaters coexist.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. An uplink transmit power control method of a terminal in a wireless communication system, the method comprising:
   receiving configuration information including a channel status information threshold value and scaling information from a base station;
   receiving a channel status information reference signal (CSI-RS) from the base station;
   determining a channel state information value based on the received CSI-RS;
   determining whether the channel state information value is greater than the channel status information threshold value included in the configuration information; and
   calculating transmit power based on the scaling information if the channel state information value is greater than the channel status information threshold value included in the configuration information.

2. The method of claim 1, further comprising transmitting the data at a previously used transmit power if the channel state information value is not greater than the channel status information threshold value included in the configuration information.

3. The method of claim 1, further comprising receiving downlink control information including a power control adjustment information of at least 3 bits.

4. The method of claim 3, wherein the transmit power is calculated based on the a power control adjustment information of at least 3 bits.

5. The method of claim 1, further comprising receiving downlink control information including a transmit power control command of at least 3 bits.

6. The method of claim 5, wherein the transmit power is calculated based on the transmit power control command of at least 3 bits.

7. The method of claim 1, further comprising:
   receiving a downlink control information carried by uplink power control bit for a cell having no uplink carrier if at least two carriers are aggregated for terminal communication, the downlink control information being used in another cell different from the cell having no uplink carrier; and
   calculating the transmit power based on the received downlink control information.

8. A terminal for controlling uplink transmit power in a wireless communication system, the terminal comprising:
   a transceiver configured to transmit and receive signals; and
   a controller configured to:
      control the transceiver to receive configuration information including a channel status information threshold value and scaling information from a base station;
      receive a channel status information reference signal (CSI-RS) from the base station;
      determine a channel state information value based on the received CSI-RS;
      determine whether the channel state information value is greater than the channel status information threshold value included in the configuration information; and
      calculate transmit power based on the scaling information if the channel state information value is greater than the channel status information threshold value included in the configuration information.

9. The terminal of claim 8, wherein the controller is configured to control the transmission of the data at a previously used transmit power if the channel state information value is not greater than the channel status information threshold value included in the configuration information.

10. The terminal of claim 8, wherein the transceiver is configured to receive downlink control information including a power control adjustment information of at least 3 bits.

11. The terminal of claim 10, wherein the controller is configured to calculate the transmit power based on the a power control adjustment information of at least 3 bits.

12. The terminal of claim 8, wherein the transceiver is configured to receive downlink control information including a transmit power control command of at least 3 bits.

13. The terminal of claim 12, wherein the controller is configured to calculate the transmit power based on the transmit power control command of at least 3 bits.

14. The terminal of claim 8, wherein transceiver is configured to receive a downlink control information carried by uplink power control bit for a cell having no uplink carrier if at least two carriers are aggregated for terminal communication, the downlink control information being used in another cell different from the cell having no uplink carrier, and the controller is configured to calculate the transmit power based on the received downlink control information.

* * * * *